Figure 1:
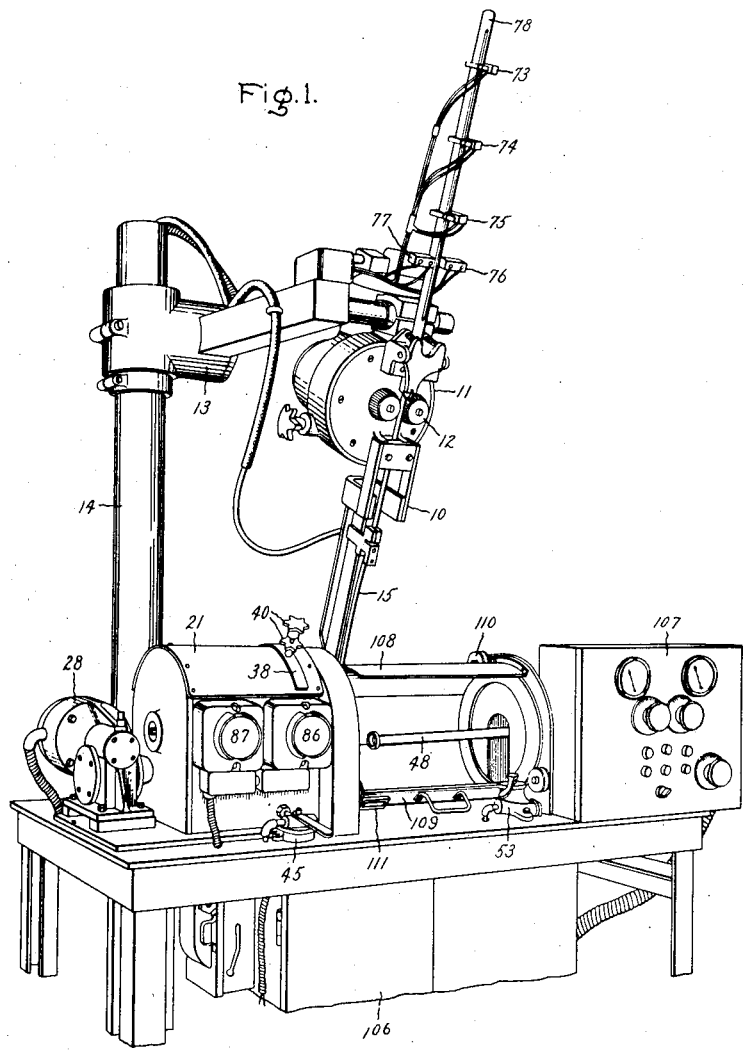

April 21, 1942.  V. J. CHAPMAN  2,280,629
ARC WELDING APPARATUS
Original Filed Aug. 9, 1940   3 Sheets-Sheet 1

Inventor:
Verni J. Chapman,
by Harry E. Dunham
His Attorney.

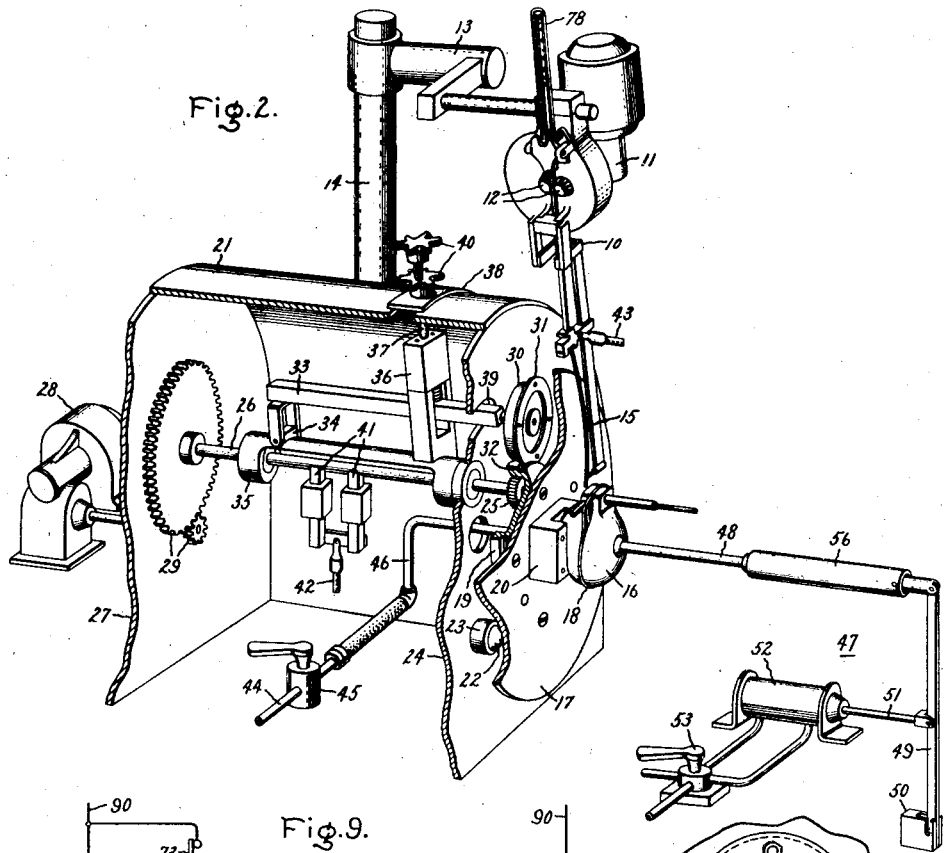

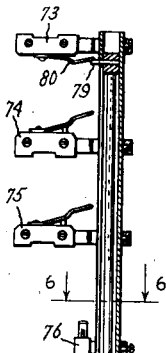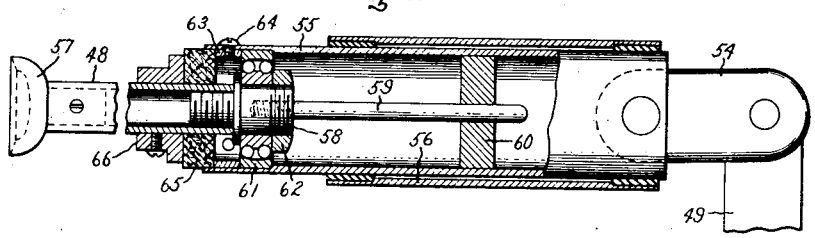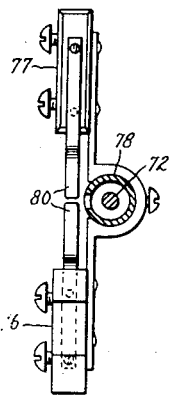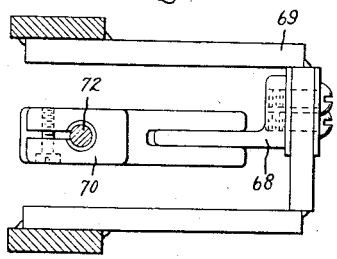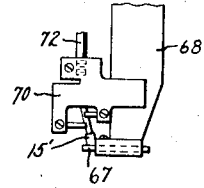

Patented Apr. 21, 1942

2,280,629

UNITED STATES PATENT OFFICE 2,280,629

ARC WELDING APPARATUS

Verni J. Chapman, Schenectady, N. Y., assignor to General Electric Company, a corporation of New York Original application August 9, 1940, Serial No. 351,995. Divided and this application August 11, 1941, Serial No. 406,388

4 Claims. (Cl. 219—8)

My invention relates to automatic arc welding apparatus for feeding stick electrodes.

It is an object of my invention to provide such apparatus in which after a predetermined electrode consumption the electrode holder is returned to its loading position by the same means employed for feeding it toward and away from the work to strike and maintain a welding arc between the work and the arcing terminal of the electrode located in the holder.

It is also an object of my invention to provide such apparatus in which each of a series of welding operations capable of being performed with the same electrode is terminated after predetermined lengths of the electrode have been consumed and in which after the last welding operation has been terminated the electrode holder is returned to its loading position.

Further objects of my invention will become apparent from the following description of the apparatus illustrated in the accompanying drawings.

Fig. 1 of the drawings is a perspective view of welding apparatus embodying my invention; Figs. 2, 3, and 4 are detail views of the work holding and traversing means of this machine; Figs. 5, 6, 7, and 8 are detail views of the stick electrode holding and feeding means forming part of this machine; and Fig. 9 is a wiring diagram showing the apparatus employed for controlling this machine in accordance with my invention.

In accordance with my invention the holder for a stick electrode is fed toward and away from the work to strike and maintain a welding arc between the work and the arcing terminal of the electrode in the holder until a predetermined feeding movement of the electrode holder toward the work operates a limit switch which interrupts the welding operation. Where it is possible to perform several welding operations with the same stick electrode a plurality of limit switches are provided for interrupting each of these welding operations. After a predetermined length of the electrode has been consumed the feeding means is suitably controlled through the actuation of a limit switch to return the holder to its loading position which is determined by the operation of another limit switch.

The apparatus shown in the drawings also embodies means for traversing a line of welding on work of irregular contour past the arcing terminal of an electrode which forms the subject matter of my parent application Serial No. 351,995, filed August 9, 1940, for Automatic arc welding apparatus.

The apparatus shown in the drawings also embodies a stick electrode feeding attachment of improved construction which forms the subject matter of my application Serial No. 406,387, filed Aug. 11, 1941, for Arc welding apparatus, which application, like the present application, is a division of my above referred to application Serial No. 351,995.

Referring to Figs. 1 and 2 of the drawings, an electrode feeding attachment 10 is mounted on a welding head 11 and propelled by the feed rolls 12 of this welding head. The welding head is illustrated as having the construction disclosed and claimed in United States Letters Patent 2,170,673, Jasper E. Anderson, granted August 22, 1939, and assigned to the assignee of this invention. It is supported on a crank shaped arm 13 which is mounted on a pillar 14 forming a part of the welding machine frame. As illustrated in the drawings, this welding head is adjustable on arm 13 and this arm is adjustable on pillar 14 so that the arcing terminal of the electrode 15 held and guided by the electrode feeding attachment 10 may be positioned at a desired point of welding over the work.

The work 16 is supported on a turntable 17 so that the line of welding 18 thereon is parallel to and in register with a flanged cam 19 having a configuration corresponding to the line of welding. This cam is mounted on the side of the turntable opposite its work supporting surface. This work surface or a member 20 mounted on the turntable and forming a part thereof is so shaped as to position the work with its line of welding parallel to and in register with cam 19. The work illustrated in the drawings is a float valve chamber formed of two shell-shaped halves which are initially assembled by spot welds between their flanged edged portions which are to be arc welded in order to complete the assembly.

Turntable 17 is mounted for rotation and translation relative to the head stock 21 of the welding machine. It is guided in its movement by a plurality of balls 22 held in ball races 23 which are supported on the end 24 of the head stock opposite thereto. It is supported through the agency of cam 19 on a feed roll 25 which is mounted on one end of a shaft 26 journaled in bearings located in the two ends 24 and 27 of the head stock of the machine. Shaft 26 and feed roll 25 are turned about their longitudinal axes by travel motor 28 which is connected through gears 29 to impart rotation thereto.

As shown in Figs. 2 and 3, cam 19 is held on feed roll 25 by a pressure roll 30 having a flanged edged portion 31 which enters a groove 32 in the outside surface portion of cam 19. Pressure roll 30 is mounted for rotation about one end of a lever 33 whose other end is pivoted at 34 to a frame 35. This frame is mounted for rotation about shaft 26 and its adjustment about this shaft causes roll 31 to swing in an arc about the axis of rotation of feed roll 25 as shown by the dotted lines in Fig. 3. Lever 33 is biased toward frame 35 by a spring clamp 36 mounted on the frame. This clamp is provided with an adjusting rod 37 which extends through a slot in the head stock of the machine and through a cover plate 38 for this slot. Its projecting end portion is provided with hand wheels 40 for adjusting the pressure which the spring clamp exerts on lever 33 as well as for rotating and positioning frame 35 relatively to the head stock of the machine. A slot 39 in end plate 24 of the head stock permits the movement of lever 33 resulting from this adjustment.

The rotational adjustment of pressure roll 30 about feed roll 25 shifts the point of tangential engagement of these rolls with cam 19 relatively to the head stock 21 of the welding machine. Since the point of welding is determined by and is opposite the point of engagement of rolls 25 and 30 with cam 19, the adjustment thus provided makes it possible to shift the point of welding relative to the frame of the machine on which the welding head is mounted. For example, in welding the float valve chamber illustrated, it was found desirable to weld in a down-sloping position and the rolls 29 and 30 were so adjusted as to position the work relatively to the head stock of the machine to accomplish this.

Welding current is supplied to the work through turntable 17, cam 19, feed roll 25, shaft 26 and brushes 41 from one terminal of a source of supply through conductor 42. The other terminal 43 of this source of supply is connected to the electrode holding portion of feeding attachment 10.

The work holding surface of the turntable may be proportioned and arranged to provide a substantially airtight engagement with the surface of the work part 16 resting thereagainst. If the chamber thus formed between the turntable and the work is connected with a vacuum line, atmospheric pressure may be employed for initially holding the work on the turntable. Such an arrangement has been illustrated in Fig. 2 where the vacuum line 44 is connected through a valve 45 and a conduit 46 to the chamber formed between the turntable and the work. The end of conduit 46 may be provided with a ball and socket joint and the conduit itself may be in part flexible as illustrated in order to accommodate the rotation and translation of turntable 17 relative to the frame of the machine on which valve 46 is supported.

A clamping pressure is applied to the work 16 through a tail stock mechanism diagrammatically illustrated at 47 in Fig. 2. This tail stock mechanism forms a part of the welding machine and is mounted on its frame. A work engaging member 48 is moved to and from the work by the movement of a lever 49 pivoted at one end in a support 50 attached to the frame of the machine. A piston rod 51 pivotally attached to a mid portion of lever 49 constitutes in combination with the fluid operated double acting piston and cylinder 52 means for moving lever 49 toward and away from the work about its pivotal support in member 50. Fluid under pressure is supplied to and exhausted from opposite ends of cylinder 52 through a valve 53 which is properly positioned to obtain the desired movement.

As shown in Fig. 4, the upper end of lever 49 is connected through a link 54 to a supporting member 55 for the work engaging member 48. Member 55 is tubular and mounted for sliding movement toward and away from the work in tubular guide 56 which is attached to the frame of the welding machine. Work engaging member 48 is also tubular in shape and has a work engaging cup 57 at one end thereof. Its other end is provided with a stud 58 threaded into the end thereof. This stud forms a support for a round spring rod 59 whose outer end extends through a round opening in a block 60 mounted within support member 55. A ball bearing 61 is located on stud 58 and held in place thereon by a nut 62 threaded onto the outer end portion of stud 58. The outer race of this ball bearing is held against an internal shoulder in the end of support member 55 by a collar 63 which is attached to the inside surface of the end of member 55 by screws 64. The race has a spherical ball engaging surface so that the connection between the work engaging member 48 and its support member 55 forms a ball and socket joint of rotation which permits the work engaging member 48 to accommodate itself to the rotational and translational movement imparted to the work 16 by the turntable 17 on which it is supported. The opening between the work engaging member 48 and its support member 55 is closed by a felt washer 65 held in place by a collar 66 mounted on and attached to member 48.

The tail stock mechanism is insulated from the frame of the machine so that welding current must be supplied to the work 16 by way of turntable 17 on which it is supported. By thus confining the direction in which welding current is supplied to the work, better welding conditions are established.

The stick electrode feeding attachment, which positions the arcing terminal of electrode 15 over the desired line of welding, is best illustrated in Figs. 5, 6, 7, and 8. It comprises an electrode guide 67 mounted on the lower end of a member 68 whose upper end is attached to and electrically insulated from one end of an angular frame 69 whose other end is attached to the welding head 11. It also comprises a holder 70 which is slidably mounted on member 68. This holder is provided with jaws 71 whose electrode engaging surfaces are out of line with the electrode-engaging surface of guide 67 and which cramp and hold the end of an electrode which has been stressed by bending to bias its other end against said guide. Welding current is supplied through conductor 43, above referred to, to holder 70 and thence to electrode 15.

Electrode holder 70 is fed toward and away from electrode guide 67 by a feed rod 72 mechanically attached thereto but electrically insulated therefrom. This feed rod is engaged by feed rolls 12 of welding head 11, and the motion thus applied to feed rod 72 is transferred to the electrode 15 through holder 70. This holder is guided along member 68 and is free to move relative thereto in the plane of the bent electrode in order to accommodate itself to the action of the bent electrode and the resistance imposed thereto by feed rod 72. The feeding attachment is positioned relative to the line of welding so that the plane of the bent electrode is directed along the line of welding. Lateral movement of the electrode relative to the line of welding is thus prevented.

By reason of the construction of the electrode-holding and guiding means, as shown in Fig. 8, movement of holder 70 away from guide 67 withdraws the stub end of a used electrode 15' from guide 67, thus releasing the cramping force which held it in holder 70. The stub end is thus free to drop from the holder during its return movement to a loading position such as illustrated in Fig. 5. The ease with which a new electrode may be inserted in the feeding attachment and its self-ejecting nature are very valuable characteristics to an operator who is thus enabled to perform more welding within a given period of time. The electrode guiding feature of this attachment also makes it possible to locate the arcing terminal of a stick electrode at a desired point of welding, which is of considerable importance when welding along an irregular seam such as at 18 of work 16.

The machine above described is typical of those machines to which my present invention may be applied. In accordance with my present invention the operation of such welding machines is determined by the feeding of measured lengths of electrode through the agency of limit switches which are operated by the travel of the electrode holder. These limit switches form part of a control diagrammatically illustrated in Fig. 9.

Where the stick electrode is of sufficient length to perform a series of welding operations the system illustrated functions to arrest each welding operation after the feeding of a measured length of electrode and after the last welding operation to return the electrode holder to its loading position. This return movement of the electrode holder is accomplished through the agency of the means employed for feeding the electrode holder toward and away from the work to strike and maintain a welding arc between the work and an electrode in the holder. Each welding operation is initiated by the welding operator and automatic operation of the system is thereafter controlled through the agency of limit switches 73, 74, 75, 76, and 77.

As shown in Figs. 1, 5, and 6, these limit switches are mounted through the agency of a tube 78 on welding head 11. This tube encloses feed rod 72 of the feeding attachment and a pin 79 on this rod extends through a slot in the tube to engage and operate these limit switches. These switches may be of any suitable type but are preferably snap actuated switches. They are operated by resilient arms 80 which are in the path of movement of pin 79. This pin in its travel snaps by the ends of arms 80 of switches 74 and 75 located intermediate the remaining switches. The relative spacing of the limit switches determines the measured lengths of electrode fed during each welding operation. This length of electrode corresponds in the particular arrangement illustrated to that required for welding seam 18 of float valve 16.

In the control diagram of Fig. 9, the contacts of the various limit switches have been identified by the same reference numerals applied to the switch as a whole in Figs. 1, 5, and 6. These switches have been illustrated in the positions they assume before being operated by pin 79 attached to feed rod 72 of the stick electrode feeding attachment. The electromagnetic relays and switches have been illustrated in their deenergized positions.

In Fig. 9 turntable 17 upon which the work is supported and electrode feeding attachment 10 have been partially represented. The arc welding electrode held and guided by the feeding attachment is moved toward and away from the work to strike and maintain a welding arc by the action of the welding head feed rolls 12 on feed rod 72 of the feeding attachment 10. These rolls are connected to and propelled by a feed motor 81. The speed and direction of rotation of this feed motor is controlled in response to the voltage between the electrode and the work so that feeding attachment 10 driven thereby advances the electrode to and from the work to strike and maintain an arc of predetermined voltage. The control illustrated in Fig. 9 is of the valve circuit type embodying electric valves 82 and 83 and their control 84 which is connected through conductors 85 to the arc welding electrode supported in feeding attachment 10 and to the turntable 17 upon which the work is supported. This control may be that illustrated in United States Letters Patent 2,175,017, William D. Cockrell, granted October 3, 1939, and assigned to the assignee of the present invention, in which case the electric valves 82 and 83 shown in Fig. 9 correspond to electric valves "6" and "7" of the circuit disclosed in said Letters Patent.

In Fig. 9 feed motor 81 may be started and stopped by the operator through the agency of a start switch 86 and a stop switch 87. The closure of switch 86 connects the operating winding 88 of relay 89 across a source of alternating current supply 90. Relay 89 controls through its contacts 91 the energization of the operating winding 92 of relay 93 and through its contacts 94 the energization of the operating winding 95 of the electromagnetic switch 96.

The operation of either relay 89 or relay 93 completes through their contacts 97 and 98 the connection of feed motor 81 through electric valves 82 and 83 to the source of supply 90. When both of these relays are deenergized, their contacts 97 and 98 complete a dynamic braking circuit for feed motor 81. Relay 93 is also provided with contacts 99 which are connected in shunt to the contacts of limit switches 96.

Electromagnetic switch 96 controls the connection of terminals 42 and 43 of the source of welding current and voltage to the welding electrode and the work through circuits previously traced in describing the physical structure of my machine. It is also provided with contacts 101 which control the energization of travel motor 28 by connecting it to a source of supply 102. Contacts 103 of this electromagnetic switch are in shunt to resistor 104 which is connected in circuit with its operating winding 95.

The nature of the control circuit shown in Fig. 9 will be better understood from a consideration of its operation. When the stick electrode feeding attachment 10 is in the position shown in Fig. 5, limit switch 73 will be open. Otherwise the various parts of the system will assume the positions illustrated.

When the operator closes start switch 86, winding 88 of relay 89 is connected across the source of supply 90 through the contacts of this start switch and the contacts of stop switch 87. This relay will consequently operate to close its contacts 94, open its contacts 91 and transfer the connection through its lower set of contacts 97 to its upper set of contacts 97. The closure of contacts 94 of relay 89 completes an energizing circuit for the operating winding 95 of electromagnetic switch 96 across the source of supply 90 through resistance 104, limit switches 74, 75, and 77, and stop switch 87. The closure of these contacts also completes a holding circuit for the operating windings 88 and 95 of relay 89 and electromagnetic switch 96 from the right-hand terminal of the source of supply 90 through conductor 105, limit switches 74, 75 and 77 and stop switch 87 to the left-hand terminal of the source of supply 90. The closure of the upper set of contacts 97 of relay 89 connects feed motor 81 across the source of supply 90 through electric valves 82 and 83.

The energization of winding 95 of electromagnetic switch 96 connects through its contacts 100 the terminals 42 and 43 of the source of welding current and voltage to the electrode and work, and the closure of its contacts 101 connects travel motor 28 across its source of supply 102. The opening of its contacts 103 inserts resistance 104 in circuit with its operating winding 95 to reduce the holding current below that required for pick-up.

It will thus be seen that by closing start switch 86, the source of welding current and voltage is applied to the electrode and the work, travel between the electrode and the work is instituted by energizing motor 28 and feed motor 81 is subject to the control of 84 in response to the voltage across the electrode and the work to feed the electrode toward and from the work to strike and maintain a welding arc of predetermined voltage.

As the welding electrode is consumed during a welding operation thus initiated, the feeding attachment 10 is fed toward the work and eventually limit switch 74 is opened by the engagement of pin 79 of feed rod 72 with the operating arm 80 of this limit switch. The opening of limit switch 74 deenergizes the operating winding 88 of relay 89 and the operating winding 95 of electromagnetic switch 96. They consequently return to the positions illustrated in Fig. 9 and thereby interrupt the supply of welding current and voltage to the electrode and work and deenergize travel motor 28 and electrode feed motor 81.

When the operator again closes start switch 86, another welding operation is initiated. This operation continues until limit switch 75 is opened by the travel of feed rod 72 attached to the electrode feeding attachment 10. Thereafter, the operator by closing the start switch 86 may institute a third welding operation which will continue until limit switches 76 and 77 are operated by pin 79 on feed rod 72 of feeding attachment 10. The operator must hold the start switch closed for the second and third welding operations until the holding circuit is completed by the respective closing of limit switches 74 and 75.

The opening of limit switch 77 interrupts the welding operation in the manners previously described. The operation of limit switch 76, however, completes an energizing circuit for operating winding 92 of the relay 93 from the right-hand terminal of the source of supply 90 through contacts 91 of relay 89 and limit switch 73 to the other terminal of the source of supply 90. The closure of contacts 99 of relay 93 completes a holding circuit for its operating winding around the contacts of limit switch 76 and the transfer of connections from its lower contacts 98 to its upper contacts 98 completes the feed motor circuit through electric valves 82 and 83 across the source of supply 90. Since the welding circuit has been opened at contacts 100 of electromagnetic switch 96, there will be no voltage between the electrode and the work and control 84 for feed motor 81 will operate to propel the feeding attachment 10 away from the work until pin 79 on feed rod 72 eventually opens limit switch 73 whereupon the various parts of the control circuit of Fig. 9 return to the positions illustrated with the exception, of course, of limit switch 73 which will be open.

It will thus be seen that the control illustrated functions to feed measured lengths of stick electrode during each of a series of welding operations and then returns the feeding attachment to its loading position for the insertion of a new electrode. It is to be noted that all this is accomplished through the agency of the control provided for the electrode feed motor which consequently not only feeds attachment 10 to strike and maintain a welding arc and to compensate for the consumption of measured lengths of electrode but also after the total consumption of the electrode reaches a predetermined maximum returns the feeding attachment to a loading position for the insertion of a new electrode.

The control of Fig. 9 is enclosed within the cabinet 106 of the machine of which it forms a part as illustrated in Fig. 1 of the drawings. A control board 107 is also provided for adjusting the voltage of the welding arc, indicating the arc welding current and voltage, adjusting the speed of the travel motor and the like.

During welding, the operator is protected from the welding arc by a cylindrical enclosure 108 which is provided with a cover 109 rotatably supported on rollers 110. This cover is provided with a light controlling window 111 through which the welding operator may view the welding operation when cover 109 completes enclosure 108. The electrode feeding attachment 10 extends through a slot at the left-hand end of enclosure 108.

In view of the description of the operations above given of the several parts of my machine, the operation of the machine as a whole will not be restated here since it is obvious.

It is apparent that the many features of my invention above described may be variously modified without departing therefrom, and I aim consequently in the appended claims to cover all such changes and modifications which fall within the true spirit and scope thereof.

What I claim as new and desire to secure by Letters Patent of the United States, is:

1. Arc welding apparatus comprising a holder for stick electrodes, means including a welding circuit for supplying welding current and voltage to said electrode holder and the work to be welded, means for feeding said holder toward the work when the voltage between an electrode in said holder and the work is greater than a predetermined value and for feeding said holder away from the work when the voltage between an electrode in said holder and the work is less than said predetermined value, means responsive to a predetermined feeding movement of said electrode holder toward the work for opening said welding circuit and maintaining the energizing of said electrode feeding means, and means responsive to a predetermined feeding movement of said electrode holder away from the work for deenergizing said feeding means.

2. Arc welding apparatus comprising an electrode holder, means including a welding circuit for supplying welding current and voltage to said electrode holder and the work to be welded, a rod attached to said holder, means for feeding said rod toward the work when the voltage between an electrode in said holder and the work is greater than a predetermined value and for feeding said rod away from the work when the voltage between an electrode in said holder and the work is less than said predetermined value, means responsive to a predetermined feeding movement of said rod toward the work for opening said welding circuit and maintaining the energizing of said electrode feeding means, and means responsive to a predetermined feeding movement of said rod away from the work for deenergizing said feeding means.

3. Arc welding apparatus comprising a holder for stick electrodes, means for feeding said electrode holder toward the work to be welded when the voltage between an electrode in said holder and the work is greater than a predetermined value and for feeding said electrode holder away from the work when the voltage between an electrode in said holder and the work is less than a predetermined value, means including a switch for controlling the supply of welding current and voltage to said electrode holder and the work, means for traversing said electrode holder and said feeding means relatively to the work, means including a start switch for energizing said feeding means and said traversing means and for operating said switch to connect said source of welding current and voltage to said electrode holder and the work, means including a plurality of limit switches sequentially operated by the travel of said electrode holder for deenergizing said feeding means and said traversing means and for operating said switch to disconnect said source of welding current and voltage from said electrode holder and the work after said electrode holder has traveled predetermined distances toward the work after each operation of said start switch and for finally deenergizing said traversing means, operating said switch to disconnect said source of welding current and voltage from said electrode holder and the work and maintaining the energization of said feeding means after said electrode holder has traveled a predetermined maximum distance toward the work and means including a limit switch responsive to a predetermined feeding movement of said electrode holder away from the work for deenergizing said feeding means.

4. Arc welding apparatus comprising an electrode holder, a rod attached to said holder, means for feeding said rod toward the work when the voltage between an electrode in said holder and the work is greater than a predetermined value and for feeding said rod away from the work when the voltage between an electrode in said holder and the work is less than a predetermined value, means including a switch for controlling the supply of welding current and voltage to said electrode holder and the work, means for traversing said electrode holder, said rod and said feeding means relatively to the work, means including a start switch for energizing said feeding means and said traversing means and for operating said switch to connect said source of welding current and voltage to said electrode holder and the work, means including a plurality of limit switches sequentially operated by the travel of said rod for deenergizing said feeding means and said traversing mean· and for operating said switch to disconnect said source of welding current and voltage from said electrode holder and the work after said feed rod has traveled predetermined distances toward the work after each operation of said start switch and for finally deenergizing said traversing means, operating said switch to disconnect said source of welding current and voltage from said electrode holder and the work and maintaining the energization of said feeding means after said feed rod has traveled a predetermined maximum distance toward the work, and means including a limit switch responsive to a predetermined feeding movement of said rod away from the work for deenergizing said feeding means.

VERNI J. CHAPMAN.